US009843679B2

(12) United States Patent
Paugam et al.

(10) Patent No.: US 9,843,679 B2
(45) Date of Patent: Dec. 12, 2017

(54) METHOD FOR PROCESSING A CUSTOMER REQUEST THROUGH A PLURALITY OF COMMUNICATION INTERFACES AND FOR SUPERVISING SUCH PROCESSING

(71) Applicant: Genesys Telecommunications Laboratories, Inc., Daly City, CA (US)

(72) Inventors: Bruno Paugam, Pluguffan (FR); Stephane Hervochon, Brest (FR)

(73) Assignee: GENESYS TELECOMMUNICATIONS LABORATORIES, INC., Daly City, CA (US)

( * ) Notice: Subject to any disclaimer, the term of this patent is extended or adjusted under 35 U.S.C. 154(b) by 410 days.

(21) Appl. No.: 13/756,492

(22) Filed: Jan. 31, 2013

(65) Prior Publication Data

US 2013/0266133 A1 Oct. 10, 2013

(30) Foreign Application Priority Data

Jan. 31, 2012 (EP) .................................... 12290039

(51) Int. Cl.
*H04M 3/51* (2006.01)
*G06Q 10/10* (2012.01)

(52) U.S. Cl.
CPC .......... *H04M 3/5175* (2013.01); *G06Q 10/10* (2013.01)

(58) Field of Classification Search
CPC .......... H04M 3/5175; H04M 3/42221; H04M 2203/401

(Continued)

(56) References Cited

U.S. PATENT DOCUMENTS 6,035,332 A 3/2000 Ingrassia, Jr. et al.
7,526,079 B2 * 4/2009 Mello ................. H04M 3/5183
379/212.01

(Continued)

FOREIGN PATENT DOCUMENTS

EP 2 624 186 A1 8/2013
WO WO 02/15030 A1 2/2002

OTHER PUBLICATIONS

European Search Report and Written Opinion for Application No. 12290039.2, dated Jun. 13, 2012, 7 pages.

*Primary Examiner* — Nafiz E Hoque
(74) *Attorney, Agent, or Firm* — Lewis Roca Rothgerber Christie LLP

(57) ABSTRACT

A method is provided for processing a customer request through a plurality of communication interfaces and for supervising such processing. Upon reception of a supervision request from a supervisor client application for supervising an operator client application, the connections established with the operator client application are monitored. When an operator of a supervised operator client application is selected for processing a customer, a connection between the communication interface and the supervised operator client application is supervised, and discussion context information of the established connection is stored in a data repository. If a connection through a different communication interface concerning the same request is established by the supervised operator client application, the discussion context information of the connection made through the different communication interface is added to the information already stored in association with the session.

20 Claims, 4 Drawing Sheets

(58) Field of Classification Search
USPC .................................... 379/265.06–265.07
See application file for complete search history.

(56) References Cited

U.S. PATENT DOCUMENTS

| | | | |
|---|---|---|---|
| 7,949,121 B1* | 5/2011 | Flockhart et al. ....... | 379/265.02 |
| 8,824,653 B2* | 9/2014 | Cutajar ................... | 379/207.16 |
| 8,842,820 B2* | 9/2014 | Fan et al. ................. | 379/265.11 |
| 2008/0219429 A1 | 9/2008 | Mandalia et al. | |
| 2009/0086957 A1* | 4/2009 | Kelley .................. | H04M 3/567 |
| | | | 379/265.09 |
| 2010/0158237 A1 | 6/2010 | McCormack et al. | |
| 2013/0039483 A1* | 2/2013 | Wolfeld et al. .......... | 379/265.03 |
| 2013/0129073 A1* | 5/2013 | Peterson ............. | H04M 3/5141 |
| | | | 379/265.09 |
| 2013/0176413 A1* | 7/2013 | Lowry et al. ................... | 348/77 |

* cited by examiner

Fig.3

| Current sessions | Operators | Customers | Time | Used interfaces |
|---|---|---|---|---|
| | | | | |
| 10230 | 5321 | Jean bono | 03:14:00 | Chat + call |
| 10232 | 205 | Pierre Durand | 03:40:00 | IM + call |
| 10228 | 620 | 612243513 | 01:25:00 | Chat + call |
| 10312 | 54 | John Gibbs | 05:40:00 | Forum |
| 10265 | 123 | Fanny Yang | 03:50:00 | E-mail + VoIP |
| 10256 | 12 | 6534859961 | 02:56:00 | Chat + SMS |
| | Available | | | |
| | 53 | | | |
| | 4620 | | | |

C1, C2, C3, C4, C5

METHOD FOR PROCESSING A CUSTOMER REQUEST THROUGH A PLURALITY OF COMMUNICATION INTERFACES AND FOR SUPERVISING SUCH PROCESSING

CROSS-REFERENCE TO RELATED APPLICATION

This application claims priority to and the benefit of European Patent Application Number 12290039.2, filed on Jan. 31, 2012, the entire disclosure of which is incorporated herein by reference.

BACKGROUND OF THE INVENTION

The present invention relates to the field of help desks and more particularly to multi-channel help desks having a plurality communication interfaces to process customers request through a plurality of communication media and the associated supervision.

In multi-channel help desk, operators are contacted by customers through different communication means or media such as voice call, web chat, e-mail or social networks. The discussion or conversation between the operator and the customer may become a multi-channel discussion if several media are used for the discussion. The use of multiple communication media allows facilitating the contact between a customer and an operator of the help desk and allows a more efficient process of a customer request.

Besides, in help desks, the operators are supervised by managers or supervisors who need to monitor the discussions of the operators to check if the operators answer efficiently to the customers request and have a suitable behaviour with the customers.

However, with the equipments of the state of the art, the establishment of a multi-channel discussions may require many manipulations for the operator to control all the media as well as for the supervisor or manager to monitor the different media used by the operator as for each medium, a dedicated application needs to be activated to control or monitor the corresponding medium.

As a consequence, the time to process a request is not optimized due to the high number of necessary manipulations which leads to a loss of overall efficiency for the help desk.

SUMMARY OF THE INVENTION

It is therefore an object of the present invention to provide a solution that overcomes at least partially the pre-cited drawbacks of the state of the art and that allows providing access to any required information or the establishment of any communication in a reduced amount of manipulations and time on the operator side as well as on the supervisor side. Another requirement of the proposed solution is the capacity to store automatically all the exchanges concerning a customer request.

Thus, the present invention refers to a method for processing a customer request through a plurality of communication interfaces and for supervising such processing, the said method comprises the following steps:
upon reception by a plurality of communication interfaces of a supervision request from a supervisor client application for supervising an operator client application, monitoring the connections established with the operator client application,
when an operator of a supervised operator client application is selected for processing a customer request through one of the plurality of communication interfaces,
creating an identified session associated with the customer and the supervised operator client application,
establishing a connection between the communication interface and the supervised operator client application,
establishing a supervision of the connection by the supervisor client application,
storing discussion context information of the established connection in a memory space associated with the session in a data repository,
if a connection through a different communication interface concerning the same request is established by the supervised operator client application,
adding the discussion context information of the said connection established through a different communication interface to the information already stored in the memory space associated with the session and,
establishing a supervision of the said connection established through a different communication interface by the supervisor client application.

According to another aspect of the present invention, the method also comprises the following steps:
receiving a request from the supervisor client application to establish a connection with the supervised operator client application through one of the communication interfaces,
establishing the connection between the supervisor client application and the supervised operator client application and,
adding the discussion context information of the said connection between the supervisor client application and the supervised operator client application to the information already stored in the memory space associated with the session.

The embodiments of the present invention also refer to a computer program product for performing the steps of:
upon reception of a request for supervising an operator client application from a supervisor client application, establishing a monitoring of the connections established with the supervised operator client application,
upon reception of a customer request,
creating an identified session associated with the customer and the supervised operator client application,
selecting an operator of a supervised operator client application to process a customer request received on a communication interface,
establishing a connection between the communication interface and the operator client application,
storing discussion context information of the established connection in a memory space associated with the session in a data repository,
establishing a supervision of a connection between a communication interface and a supervised operator client application by a supervisor client application
if a connection through a different communication interface concerning the same request is established by the supervised operator client application,
establishing a supervision of the said connection established through a different communication interface by the supervisor client application and, adding the discussion context information of the said connection established through a different communication interface to the information already stored in the memory space associated with the session.

The embodiments of the present invention also refer to a computer telephony integration server of a help desk structure, the said server comprises:
a plurality of communication interfaces configured for:
establishing a connection with operator client applications and supervisor client applications,
receiving a request for supervising an operator client application from a supervisor client application,
establishing a supervision of a connection with an operator client application by a supervisor client application,
a data repository,
a routing unit configured for:
selecting an operator of a supervised operator client application to process a customer request received on a communication interface,
establishing a connection between a communication interfaces and a supervised operator client application,
a reporting unit configured for
receiving information from the routing unit and from the operator client applications and the supervisor client applications,
creating an identified session associated with the customer and the supervised operator client application,
storing discussion context information of the connections established with the supervised operator client application in a space memory associated with the session in the data repository.

BRIEF DESCRIPTION OF THE DRAWINGS

FIG. 3 is a chart representing an example control panel displayed on a supervisor user equipment.

Figure 1:
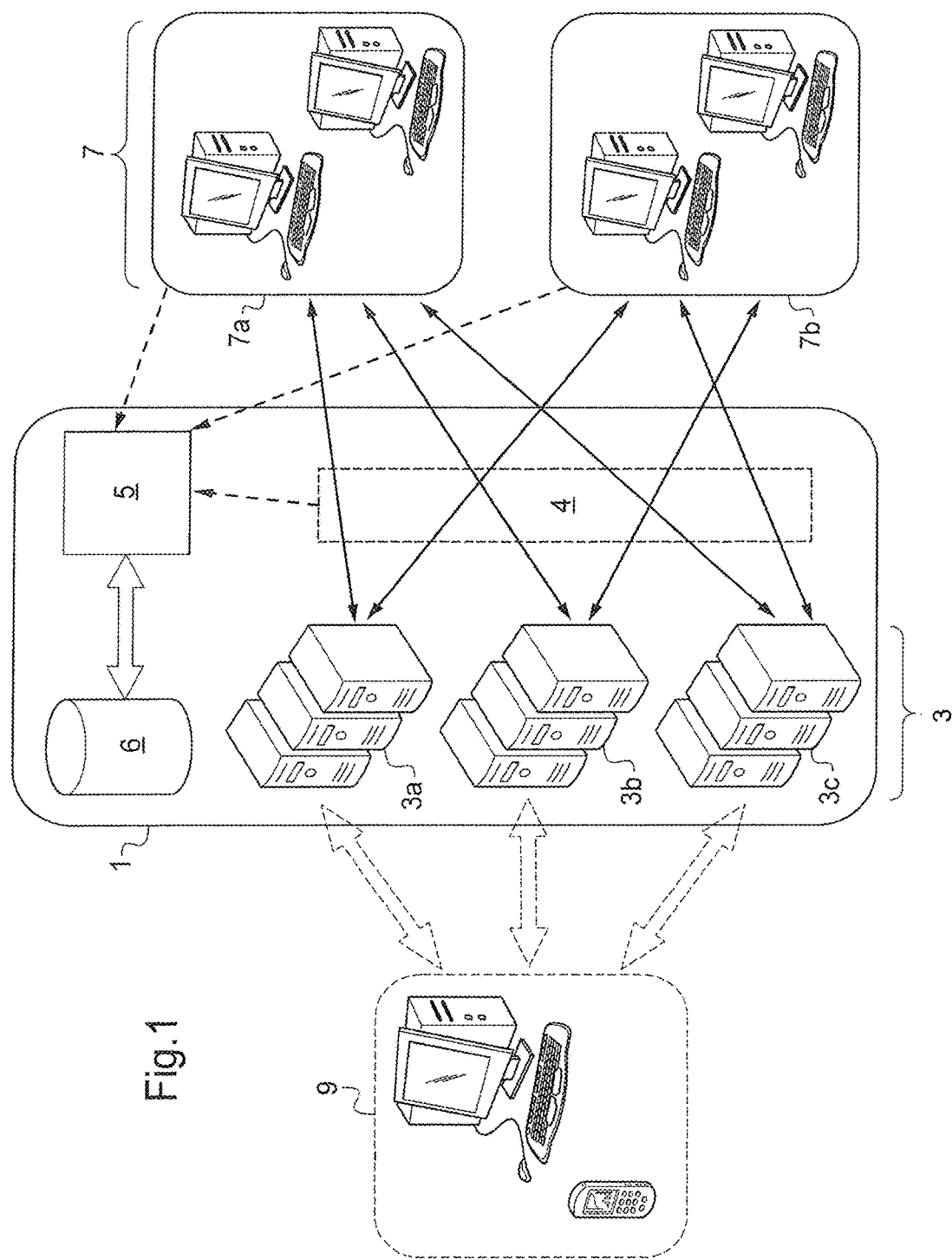
FIG. 1 is a diagram of a help desk structure.

The following description will be achieved based on the above referenced figures wherein the elements having the same reference refer to elements having the same function. Furthermore, for reference comprising a number and a letter, the number represents a class of elements having similar function and the letter defines a particular member of the class. For the example the reference 3a defines an element of the class corresponding to the communication interfaces 3 and the element 3a represents a voice call communication interface.

DETAILED DESCRIPTION OF THE INVENTION

As used herein, the term "customer request" refers to a request for service or for information sent by a customer. It can be a message posted on a forum or social network, an e-mail, a Short Message System (SMS), a voice call . . . .

As used herein the term "data repository" refers to any memory space comprising capacities for storing data. It could be a database, a read-only memory (ROM) space, a memory card . . . .

As used herein, the term "CTI" refers to the acronym Computer Telephony Integration.

As used herein the term "client application" refers to an application or system that accesses a service or data made available by a server or another system. An operator client application thus refers to an application installed on an operator user equipment that provides services made by a central server, for example a CTI server.

As used herein, the term "API" refers to the acronym Application Programming Interface and corresponds to a source code based specification intended to be used as an interface by software components to communicate with each other.

As used herein the term "multi-channel help desk" refers to a help desk comprising a plurality of different communication media such as voice call, web chat, instant messaging, video conference, electronic mail . . . . Such help desk is configured to receive the above cited customer requests.

As used herein, the term "user equipment" refers to any electronic equipment allowing the establishment of a connection with remote equipments. The user equipment can be a computer, a phone, a smartphone, a personal digital assistant, a tablet computer or any equipment comprising a processing unit and an interface to allow a user to exchange data with other users of remote equipments.

As used herein, the term "IM" refers to the acronym Instant Messaging.

As used herein, the term "VoIP" refers to the acronym Voice over Internet Protocol.

As used herein, the term "discussion" refers to any type of communication exchanges, such as writing exchange by e-mail, SMS, through forum written message or web chat, vocal exchange such as phone call or Internet call (VoIP) or video exchange (video conference). Furthermore, the term "discussion context information" refers to any information dealing with the discussion between the different user equipments. It can be the discussion exchanges as well as additional details such as the identification of the participants of the discussion.

The embodiments of the present invention refer to a method for processing a customer request in a help desk structure comprising a plurality of communication interfaces corresponding to a plurality of communication media such as voice call, web chat, instant messaging, video conference, electronic mail, social network . . . . Several media may be used within a single session corresponding to the processing of a single customer request. The exchanges of the different communication interfaces of a session may be accessible by a single client application.

FIG. 1 represents an example of structure of a multi-channel help desk. The help desk comprises a computer telephony integration (CTI) server 1 comprising several communication interfaces 3, three in the present case, a voice call interface 3a, a web chat interface 3b and an instant messaging interface 3c, a routing unit 4, a reporting unit 5 and a data repository 6. However, it has to be noted that the CTI server 1 may comprises other communication interfaces such as an electronic message interface, a social network interface . . . . The different interfaces 3 are capable of establishing a communication between a remote customer equipment 9 and the client applications 7 of the help desk structure. The communication interfaces 3 also comprises a plurality of ports, each port corresponding to a connection with a user equipment and a presence unit for determining the user identity associated with the user equipments connected to the ports of the communication interface 3. Furthermore, the communication interfaces comprise application programming interfaces (API) to establish connections with client applications.

The routing unit 4 receives connection request from the communication interfaces when a customer request is received by the said communication interfaces, selects an available operator to process the customer request and indicates, to the communication interface, the client application associated with the selected operator.

The reporting unit 5 gathers and processes the context information of the discussions occurring through the connections established by the communication interfaces 3.

The client applications are divided into two types, a first type 7a corresponding to the operator client applications (one per operator user equipment) and a second type 7b corresponding to the supervisor client applications (one per supervisor user equipment).

The CTI server and the user equipments providing the client applications 7 comprises processing means that may be provided through the use of dedicated hardware as well as hardware capable of executing software in association with appropriate software. When providing by a processor, the processing means may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardwares, conventional and/or custom, may also be included.

Figure 2:
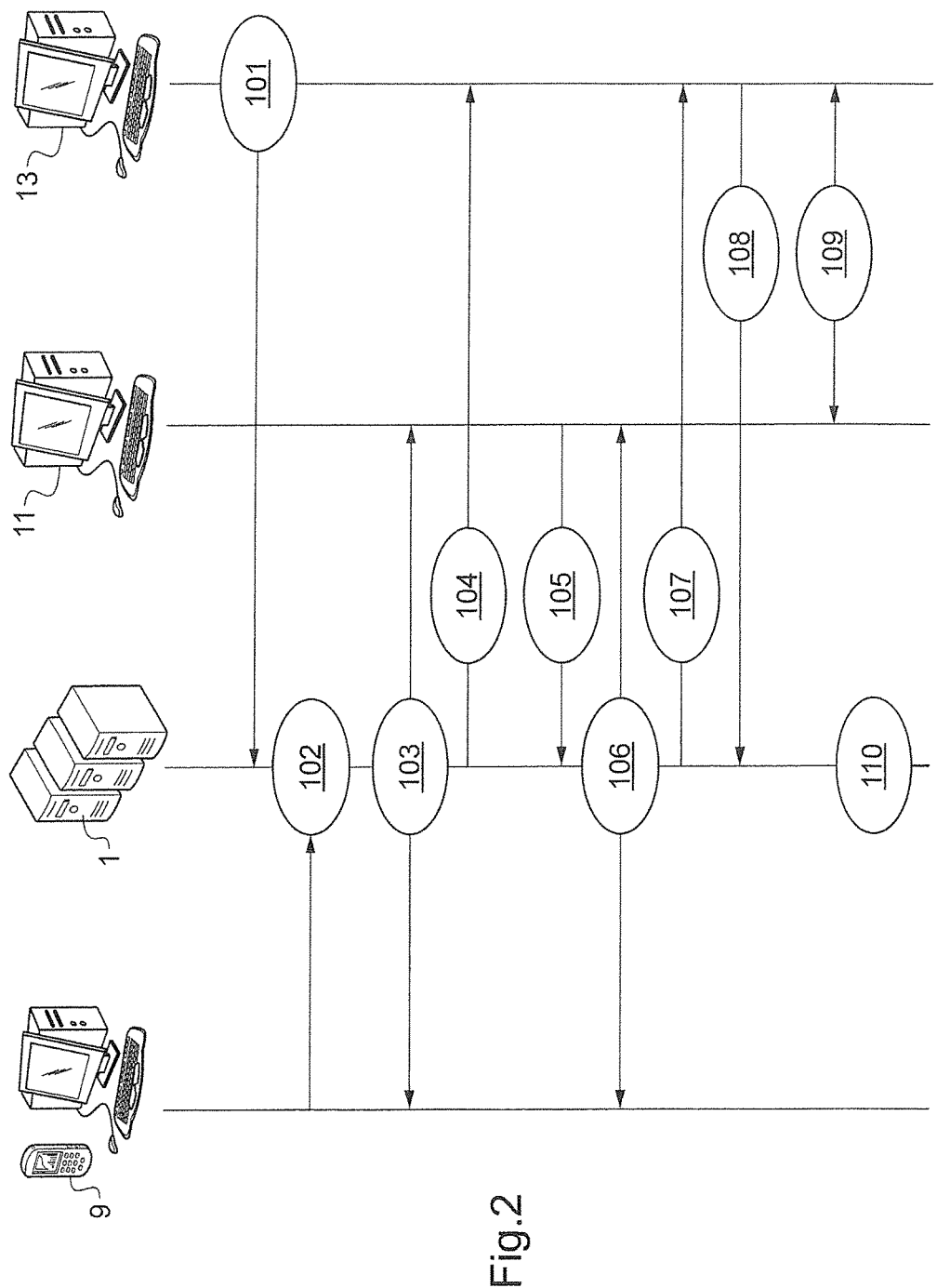
FIG. 2 is a diagram showing the different step of the method according to the embodiments of the present invention and the interactions between the different entities of the help desk.

The different steps of the method according to the embodiments of the present invention will now be described based on the diagram of FIG. 2 wherein the vertical lines represent the different equipments involved in the method, a customer user equipment 9, a CTI server 1, an operator user equipment 11 and a supervisor user equipment 13. The horizontal arrows represent the interactions between these equipments.

The operator user equipment 11 through the operator client application 7a, at login time, reserves a user port on each communication interface on which he wants to work. The presence unit registers the association between each port and the operator client application 7a.

The first step 101 refers to the establishment of a supervision or monitoring of the discussions of an operator by the supervisor client application 7b. This establishment is triggered by the sending of a request from the supervisor client application 7b to the communication interfaces of the CTI server 1 to monitor the ports on which the operator client application of the targeted operator is logged in. The presence unit is used by the supervisor client application 7b to get the ports used by the operator client application 7a. At the reception of the request, a monitoring of this port is established until the next connection on this port.

The second step 102 refers to the selection of the designated operator client application to process a customer request received on one of the communication interfaces and the creation of a new session. When a customer request is received, for example a chat message, at communication interface 3b, a signal is transmitted to the routing unit 4. The routing unit 4 then determine an available operator to process the request and sends back the address of the operator client application 7a associated with the selected operator.

Besides, the routing unit 4 sends the information of the establishment of the new connection to the reporting unit 5. The reporting unit 5 then creates an identified session which comprises an identification of the involved operator and customer, for example the operator is identified by a number and the customer is identified by its name, a phone number, an IP address . . . . Besides, at the creation of the session, a space memory associated with the session is defined in the data repository 6 to store discussion context information associated with the session, for example the identification of the operator and the customer and all the discussions occurring during the session, the starting and ending times of the connections . . . .

The third step 103 refers to the establishment of the connection of the communication interface 3b with the supervised operator client application associated with the selected operator. Such connection is established by connecting the port corresponding to the customer user equipment to the port corresponding to the supervised operator client application. Furthermore, the supervised operator client application interacts with the reporting unit 5 to provide to the reporting unit 5 the discussion context information, that is to say the discussion data.

The fourth step 104 refers to the establishment of the supervision by the supervisor client application. Indeed, as the connections with the supervised operator client application are monitored by the communication interfaces 3, the establishment of the connection at step 103 by the communication interface 3b is detected and triggers the establishment of the supervision. Such supervision is established by the communication interface 3b by transmitting the chat messages exchanged through the established connection to the supervisor client application 7b.

The supervisor client application 7b then provides the exchanged messages to the supervisor for example by displaying the information on a screen of the supervisor user equipment 13 or playing the vocal discussion through a speaker in the case of a vocal connection.

Furthermore, the supervision can be achieved silently so that the operator is not aware of the supervision or a signal, for example an indicator on the screen of the operator user equipment 11, may indicate to the operator that a supervisor is monitoring his or her exchanges with the customer. During supervision, the supervisor may also barge into a conversation between the operator and the customer. Such feature is achieved by sending a request from the supervisor client application 7b to communication interfaces 3b to establish an additional connection and create a conference in the identified session through the selected communication interface 3b. The operator and the customer may receive a notification indicating that a third person is taking part to their conversation. The supervisor client application also interacts with the reporting unit 5 to provides to the reporting unit 5 information about the supervision (starting and ending time of the supervision . . . )

The fifth step 105 refers to the establishment by the operator client application 7a of the user equipment 11 of a second connection with the customer through a different communication interface 3 using a different media. For example, the customer request was initially a chat message on an Internet forum and after a few exchanges on the forum, the operator decides to call the customer by phone as it seems to be a more efficient mean to process the customer request. The customer phone number can be provided by the customer through the forum or information about the customer including its phone number can be stored in a data repository 6 if this information has been stored during a previous exchange or at the purchase by the customer of a good or service provided by the company corresponding to the help desk. To establish this communication, the operator client application sends a request to the communication interface 3a to establish a voice call with the identified customer user equipment.

The sixth step 106 refers to the establishment of the connection between the operator client application and the customer user equipment through the communication interface 3a corresponding to the voice call.

The step 107 refers to the establishment of a supervision of the established voice call connection by the supervisor client application. Indeed, as in step 104, the establishment of a connection with the supervised operator client application triggers the supervision of the established connection and the communication interface 3a transmits the vocal discussion to the supervisor client application 7b. The voice call is displayed in the same window as the previous chat interaction, as both interactions share the same context, i.e. the same session.

The eighth step 108 which is an optional step refers to the establishment of a coaching connection between the supervisor client application 7b and the operator client application of the supervised operator through one of the communication interfaces 3, preferably a communication interface 3 which is not already used between the operator and the customer in order to avoid disturbing the operator during its conversation with the customer. This coaching connection is established by sending a request from the supervisor client application 7b to the corresponding communication interface 3 to establish a connection with the designated operator client application. For example, if the operator uses a forum and a voice call to communicate with the customer, the supervisor may use an instant messaging interface 3c to give advices to the operator in order to help him or her in the processing of the customer request. Such feature may be particularly useful with starting operators who need to be trained and managed. Furthermore, as the same client application 7b is used for establishing the coaching connection, such coaching connection can be triggered by the same interactive display interface used for the monitoring, for example a single window can be used for displaying the monitoring information and providing command buttons for establishing a coaching connection. Besides, the discussion data of the coaching connection are provided by the supervisor client application to the reporting unit in order to be stored with the other discussion context information of the session.

The ninth step 109 refers to the end of the different connections established with the operator client application 7a. When the customer request is processed, the connections established between the operator client application 7a and the communication interfaces 3 are ended, either by the operator itself or by the customer or the supervisor and when all the connections are ended, the session is closed and the information stored in the space memory associated with the session during the session are gathered in a session report and stored as archives or records in a data repository 6. Thus, the discussions of a session can be analysed afterwards and the development of the events that have occurred during the session can be entirely rebuilt.

Besides, it has to be noticed that the step 101 of establishing a supervision of the discussion of an operator may also occur while the operator is communicating with a customer. In this case, the different communication interfaces for which a connection is established with the operator client application 7a of the designated operator establish the supervision by the supervisor client application of the connection. Moreover, the supervisor client application can require discussion context information from the reporting unit 5 to get information about the previous part of the discussion between the operator and the customer. concerning the supervision may occur much earlier in the process. The monitoring may also be stopped at any time by the supervisor, for example by a click in the monitoring window leading to the stop of the supervision.

Besides, in the previous steps, two different communication interfaces 3 have been used by the operator for processing the customer request but, if necessary, a higher number of connections through different media can be established between the operator and the customer.

The steps of the method are implemented through or together with a computer program written in e.g. Very high speed integrated circuit Hardware Description Language (VHDL) or C, C++, Java, or using another programming language, or implemented by one or more VHDL, C, C++, or Java processor routines, or several software modules being executed on at least one hardware device.

The computer program product that comprises the computer program can be any kind of device which can be programmed including e.g. any kind of computer like server or a personal computer, an FPGA, a processor, or the like, or any combination thereof, e.g. one processor and 2 FPGA.

The storage means that comprise the software instructions of the computer program could be any kind of data repository in any storage medium such as a CD or disk, e.g. Universal Serial Bus (USB) memory stick or any kind of memory, e.g. at least one random access memory (RAM) or read-only memory (ROM), or the like, or any combination thereof, e.g. one ROM and 2 RAMS, or 2 disks, etc.

In order to better understand the present invention, an example will now be described.

A customer named Jean Bono sends a request to establish a chat with an operator on the website of a company named AB. The customer has previously identified himself by logging on the website of AB. The chat request is received by the communication interface 3b of the help desk. The presence unit of the communication interface then retrieves information associated with the user equipment used by Mr Bono and stores them in a database as information associated with Jean Bono. A session numbered 10230 is created by the reporting unit 5 and the operator 5321 is selected by the routing unit to chat with Mr Bono. Using the chat, Mr Bono explains that he has troubles to configure an equipment bought from AB. As the manipulations for achieving the configuration of this equipment are cumbersome, the operator 5321 decides to call the customer on his cellphone to be more efficient. Mr Bono has given his phone number during the creation of his user account on the website so that his phone number is already registered in the AB database. As a consequence, the operator 5321 only needs to click on a control button to automatically launch a call to Mr Bono. The call is established by the communication interface 3a and the operator 5321 starts to give instructions to Mr Bono by phone. Moreover, the chat connection is also used to transmit the necessary set up parameters to the customer.

On the supervisor side, the supervisor has a control panel showing the global activity of the operators that he needs to supervise.

FIG. 3 represents an example of a control panel that can be displayed on a supervisor screen.

It comprises the current sessions identifications in a first column C1, the identifications of the operators dealing with the corresponding sessions in the second column C2, the customers identifications in a third column C3, the elapsed time since the beginning of the session in a fourth column C4 and the communication interfaces used in the session in a fifth column C5. The currently available operators are also indicated in the column C2.

As one can notice, the customers can be identified by their name if they are known or by their phone number or IP address or any identification. Thus, the supervisor may determine if an operator spends too much time on the processing of a request or do not use the most relevant communication interface . . . .

In order to check the behaviour of his operator, the supervisor decides to supervise the operator 5321 which is the operator having a chat and a call session with Mr Bono. To do so, the supervisor clicks on the identification 10230 of the corresponding session on the control panel presented in FIG. 3.

This click on the identification of the session 10230 produces the sending of a request from the supervisor client application 7b to the communication interfaces to establish a supervision of the operator client application associated with the operator 5321. Furthermore, the supervisor client application requests information from the reporting unit 5 about the session 10230. The information stored in the space memory associated with this session are then transmitted by the reporting unit 5 to the supervisor client application 7b. A monitoring window corresponding to the session 10230 which corresponds to the operator 5321 is then opened on the screen of the supervisor user equipment 13.

Figure 4:
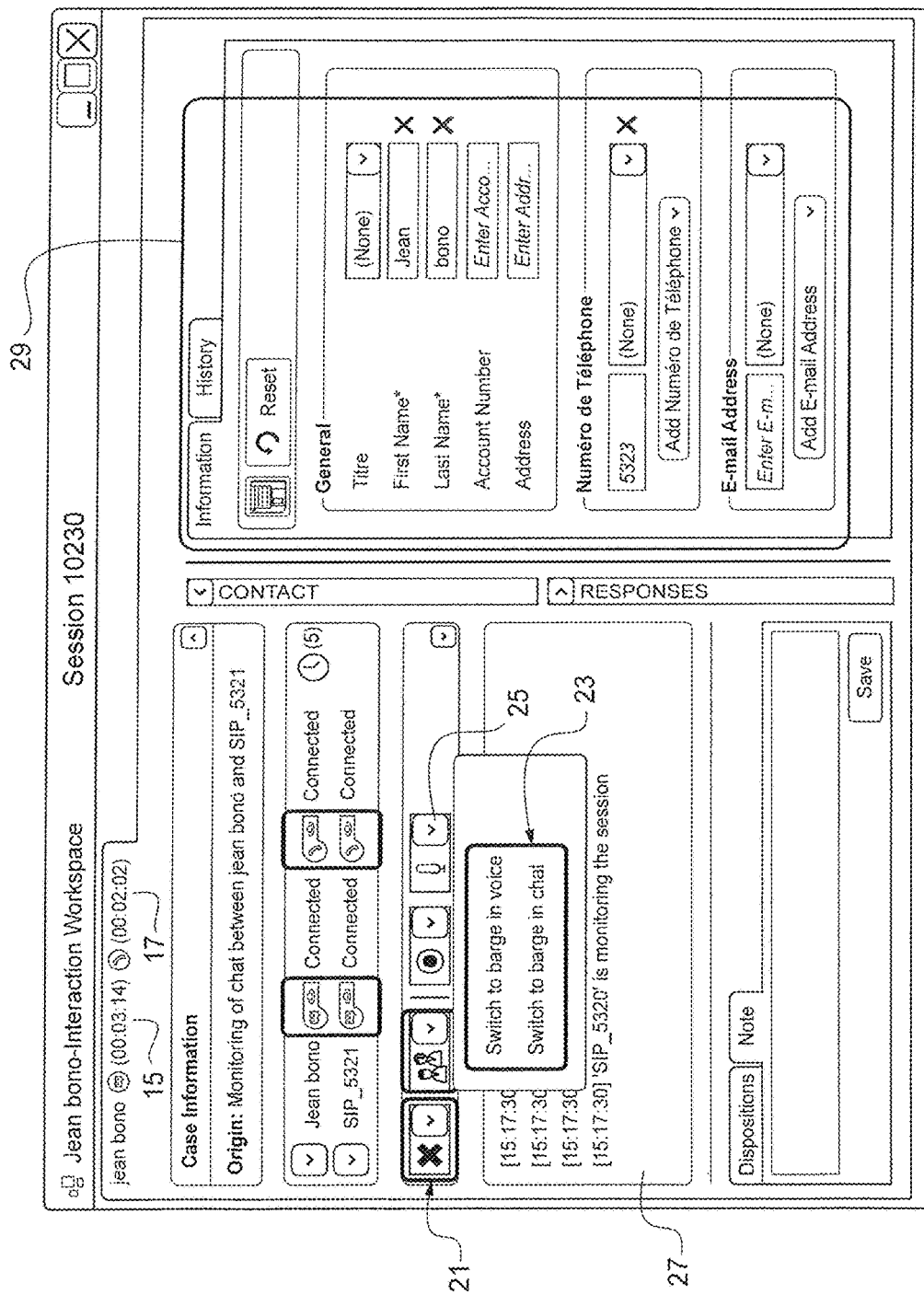
FIG. 4 is a diagram of a session monitoring window presentation.

FIG. 4 represents an example of monitoring window displayed on the screen of the supervisor user equipment 13.

This window gathers the essential information of the discussions that have occurred during the session 10230 such as the duration of the chat 15 and of the call 17, the activated connections between the operator and the customer 19, control buttons to deactivate the monitoring of a communication interface 21, to barge in one of the current conversations of the session 23, to establish a connection with the operator 25 and an area comprising the last chat discussion exchanges in chronological order 27. Information concerning the customer may also be displayed in a dedicated area 29. The supervisor also receives the current call discussion exchanges between the operator and the customer in his headphone.

Listening to the discussion between the operator 5321 and Mr Bono, the supervisor notices that the operator 5321 has forgotten to tell a detail to Mr Bono during the explanation of the configuration. To give his comments to the operator without disturbing his conversation with Mr Bono, the supervisor launches an instant messaging connection with the operator 5321. A command for launching this connection is already integrated in the menus of the monitoring window so that a click on the corresponding icon of the menu is sufficient for the supervisor to establish the instant messaging connection and send his comments to the operator 5321. The comments of the supervisor are transmitted to the operator client application 7a through the instant messaging connection and displayed on the screen of the operator user equipment 11. These comments are displayed in the same window as the other information concerning the session 10230. When all the connections between the operator and the customer as well as the coaching connection are closed, the session 10230 ends and a session report gathering all the exchanges having occurred during the session 10230 is stored in the data repository 6. Such report can be used afterwards, for example for analysing the points an operator needs to improve or in case of a complain from a customer or an operator.

Thus, the use of an identified session combined with the automatic establishment of a supervision when a connection is established with the supervised operator through a communication interfaces allows easing the supervision of operators in multi-channel discussions using different media. Moreover, the embodiments of the present invention allow an efficient and automatic data recording. These features create a more comfortable environment for the supervisors as well as a gain of time for the supervisor leading to an increased overall efficiency of the help desk.

The invention claimed is:

1. A method for managing customer interactions in a contact center, the method comprising:
    transmitting, by a processor, a first signal to a switch to establish a first connection between a first device associated with a customer and a second device associated with an agent of the contact center;
    storing, in a memory, by the processor, first context information obtained from the first connection, wherein the context information corresponds to a communication session and includes a history of discussion exchanges during an interaction between the customer and the agent during the communication session over the first connection;
    transmitting, by the processor, during the communication session, a second signal to the switch to establish a second connection between a different device associated with the customer and the second device associated with the agent of the contact center;
    merging, by the processor, second context information obtained from the second connection with the first context information obtained from the first connection to generate merged context information of the customer, the second context information obtained from the second connection including a history of discussion exchanges during an interaction between the customer and the agent during the communication session over the second connection; and
    transmitting, by the processor, the merged context information to a third device associated with a supervisor of the agent for concurrently displaying the merged context information on the third device, wherein the third device is different from the first device and the second device.

2. The method of claim 1, further comprising monitoring, by the processor, the first connection between the first device associated with the customer and the second device associated with the agent of the contact center during the communication session.

3. The method of claim 1, wherein the first connection is in a text-based communication channel.

4. The method of claim 1, wherein the second connection is in voice-based communication channel.

5. The method of claim 1, further comprising receiving, by the processor, a request to establish a third connection between the first device associated with the customer and the third device associated with the supervisor of the agent.

6. The method of claim 5, further comprising transmitting, by the processor, a third signal to the switch to establish the third connection.

7. The method of claim 1, further comprising displaying, by the processor, the merged context information on a display of the third device associated with the supervisor of the agent.

8. The method of claim 1, further comprising displaying, by the processor, information regarding a plurality of communication sessions on a display of the third device associated with the supervisor.

9. The method of claim 8, further comprising transmitting, by the processor, a third signal to the switch to establish a third connection between the first device associated with the customer and the third device associated with the supervisor of the agent in response to the communication session being selected from among the plurality of communication sessions.

10. The method of claim 1, further comprising:
receiving, by the processor, a request to barge into the communication session from the third device associated with the supervisor of the agent; and
transmitting, by the processor, communication data from the third device associated with the supervisor of the agent to the first device associated with the customer.

11. A system for managing customer interactions in a contact center, the system comprising:
a switch configured to receive a plurality of communications for routing to one or more communication devices;
a processor coupled to the switch; and
a memory coupled to the processor, wherein the memory stores instructions that, when executed by the processor, cause the processor to:
transmit a first signal to the switch to establish a first connection between a first device associated with a customer and a second device associated with an agent of the contact center;
store, in the memory, first context information obtained from the first connection, wherein the context information corresponds to a communication session and includes a history of discussion exchanges during an interaction between the customer and the agent during the communication session over the first connection;
transmit, during the communication session, a second signal to the switch to establish a second connection between a different device associated with the customer and the second device associated with the agent of the contact center;
merge second context information obtained from the second connection with the first context information obtained from the first connection to generate merged context information of the customer, the second context information obtained from the second connection including a history of discussion exchanges during an interaction between the customer and the agent during the communication session over the second connection; and
transmit the merged context information to a third device associated with a supervisor of the agent for concurrently displaying the merged context information on the third device, wherein the third device is different from the first device and the second device.

12. The system of claim 11, wherein the instructions further cause the processor to monitor the first connection between the first device associated with the customer and the second device associated with the agent of the contact center during the communication session.

13. The system of claim 11, wherein the first connection is in a text-based communication channel.

14. The system of claim 11, wherein the second connection is in voice-based communication channel.

15. The system of claim 11, wherein the instructions further cause the processor to receive a request to establish a third connection between the first device associated with the customer and the third device associated with the supervisor of the agent.

16. The system of claim 15, wherein the instructions further cause the processor to transmit a third signal to the switch to establish the third connection.

17. The system of claim 11, wherein the instructions further cause the processor to display the merged context information on a display of the third device associated with the supervisor of the agent.

18. The system of claim 11, wherein the instructions further cause the processor to display information regarding a plurality of communication sessions on a display of the third device associated with the supervisor.

19. The system of claim 18, wherein the instructions further cause the processor to transmit a third signal to the switch to establish a third connection between the first device associated with the customer and the third device associated with the supervisor of the agent in response to the communication session being selected from among the plurality of communication sessions.

20. The system of claim 11, wherein the instructions further cause the processor to:
receive a request to barge into the communication session from the third device associated with the supervisor of the agent; and
transmit communication data from the third device associated with the supervisor of the agent to the first device associated with the customer.

* * * * *